United States Patent
Liu et al.

(10) Patent No.: US 10,348,197 B2
(45) Date of Patent: Jul. 9, 2019

(54) DC-DC CONVERTER WITH TRANSIENT CONTROL AND THE METHOD THEREOF

(71) Applicant: Monolithic Power Systems, Inc., San Jose, CA (US)

(72) Inventors: Chao Liu, Sunnyvale, CA (US); Lijie Jiang, Hangzhou (CN); Qian Ouyang, Hangzhou (CN); Xiaokang Wu, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 15/623,265

(22) Filed: Jun. 14, 2017

(65) Prior Publication Data
US 2017/0288539 A1    Oct. 5, 2017

Related U.S. Application Data

(63) Continuation-in-part of application No. 15/344,429, filed on Nov. 4, 2016.

(30) Foreign Application Priority Data

Nov. 12, 2015   (CN) .......................... 2015 1 0770698

(51) Int. Cl.
    *H02M 3/156*    (2006.01)
    *H02M 1/08*     (2006.01)
    *H02M 1/00*     (2006.01)

(52) U.S. Cl.
    CPC .......... *H02M 3/156* (2013.01); *H02M 1/08* (2013.01); *H02M 2001/0009* (2013.01); *H02M 2001/0025* (2013.01); *H02M 2003/1566* (2013.01)

(58) Field of Classification Search
    CPC . G05F 1/575; G05F 1/56; G05F 1/565; G05F 1/573; G05F 1/569; G05F 1/5735; H02M 3/156; H02M 3/33515; H02M 3/33507
    USPC ................................ 323/273–277, 280–288
    See application file for complete search history.

(56) References Cited

U.S. PATENT DOCUMENTS

| | | | |
|---|---|---|---|
| 8,198,880 B2 | 6/2012 | Ouyang | |
| 8,400,129 B2 | 3/2013 | Ouyang | |
| 8,749,216 B2 | 6/2014 | Li et al. | |
| 9,035,628 B2* | 5/2015 | Chan | H02J 1/102 323/272 |
| 9,356,510 B2 | 5/2016 | Jiang et al. | |
| 9,479,043 B2 | 10/2016 | Jiang et al. | |
| 2010/0253307 A1* | 10/2010 | Chen | H02M 1/4225 323/283 |

(Continued)

OTHER PUBLICATIONS

U.S. Appl. No. 12/634,021, filed Dec. 9, 2009, Monolithic Power Systems.

(Continued)

*Primary Examiner* — Jue Zhang
*Assistant Examiner* — Kevin H Sprenger
(74) *Attorney, Agent, or Firm* — Perkins Coie LLP (57) ABSTRACT

A DC-DC converter with transient control. The DC-DC converter includes a power switching circuit, a current to voltage converter, a PI circuit 403, a voltage to current converter 404 and a logic and control circuit 405. The DC-DC converter obtains the transient information of a current flowing through the power switching circuit, to slow down the variation of the output voltage, so as to eliminate the overshot issue.

14 Claims, 11 Drawing Sheets

(56) References Cited

U.S. PATENT DOCUMENTS

| | | | |
|---|---|---|---|
| 2011/0187336 A1* | 8/2011 | Wu | G05F 1/10 |
| | | | 323/282 |
| 2011/0187341 A1* | 8/2011 | Chiu | G05F 1/618 |
| | | | 323/285 |
| 2012/0155121 A1* | 6/2012 | Yao | H02M 3/33507 |
| | | | 363/21.12 |
| 2013/0293212 A1* | 11/2013 | Philbrick | H02M 3/157 |
| | | | 323/283 |
| 2016/0079875 A1 | 3/2016 | Lin et al. | |

OTHER PUBLICATIONS

U.S. Appl. No. 13/706,181, filed Dec. 5, 2012, Chengdu Monolithic Power Systems Co., Ltd., Chengdu, China.
U.S. Appl. No. 14/527,685, filed Oct. 29, 2014, Chengdu Monolithic Power Systems Co., Ltd., Chengdu, China.
U.S. Appl. No. 15/062,010, filed Mar. 4, 2016, Chengdu Monolithic Power Systems Co., Ltd., Chengdu, China.

* cited by examiner

DC-DC CONVERTER WITH TRANSIENT CONTROL AND THE METHOD THEREOF

CROSS-REFERENCE TO RELATED APPLICATIONS

This application is a continuation-in-part of U.S. patent application Ser. No. 15/344,429, filed on Nov. 4, 2016, which claims priority to and the benefit of Chinese Patent Application No. 201510770698.X, filed Nov. 12, 2015.

FIELD

The present invention relates to electronic circuits, more specifically, the present invention relates to DC-DC converter with COT (constant on time) control and the method thereof.

BACKGROUND

Most electric devices such as notebook, desktop computer and PDA need a regulated voltage to power function blocks. DC-DC converters with COT control characterized with fast transient response and simple structure are widely used in the above fields. Typically, DC-DC converters with COT control need slope compensation to stabilize the output voltage.

A slope compensation signal has a fixed slope in prior art. It is reset to zero when a main power switch in the converter turns on. Then it increases with a fixed slope until the slope compensation signal is reset again when the output voltage of the converter drops to a sum of the slope compensation signal and a reference voltage. This process repeats during the operation of the converter.

Figure 1:
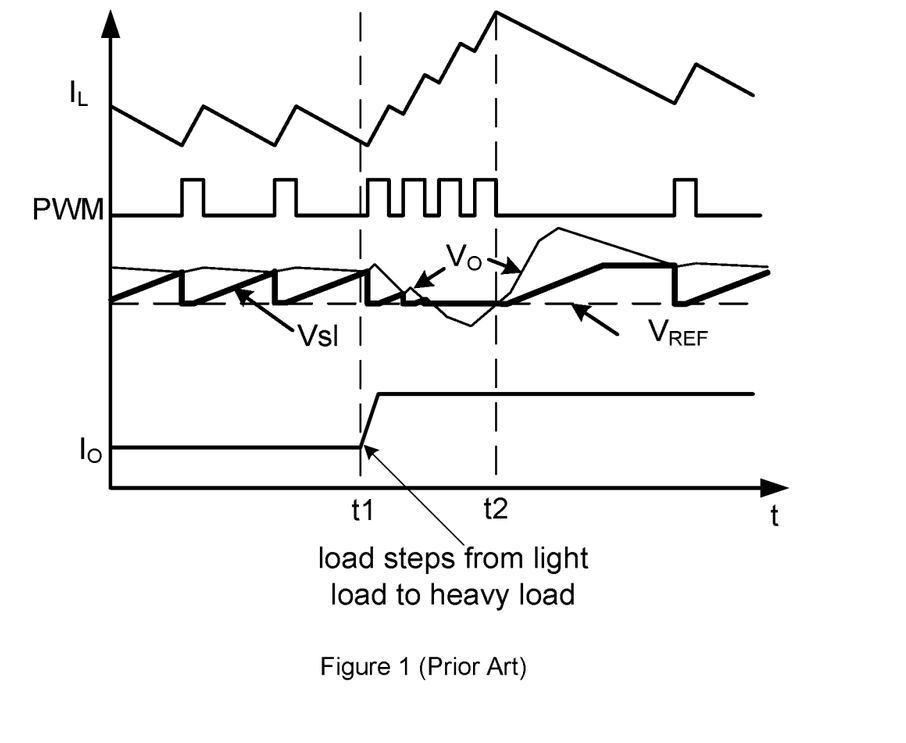
FIG. 1 schematically shows time waveforms of the inductor current $I_L$, the switching control signal PWM, the output voltage $V_O$, the slope compensation signal $V_{SL}$, the reference voltage $V_{REF}$ and the output current $I_O$ in a typical DC-DC converter with COT control when the load suddenly steps to heavy load from light load.

However, if load step occurs (e.g. the load steps to heavy load from light load, or the load steps to light load from heavy load), the output voltage decreases rapidly and falls below the reference voltage in a short time period. FIG. 1 schematically shows time waveforms of the inductor current $I_L$, the switching control signal PWM, the output voltage $V_O$, the slope compensation signal Vsl, the reference voltage $V_{REF}$ and the output current $I_O$ in a typical DC-DC converter with COT control when the load suddenly steps to heavy load from light load, wherein the x axis represents time. As shown in FIG. 1, the load suddenly steps to heavy load from light load at time point t1. Then the slope compensation signal $V_S l$ is reset to zero several times and a plurality of switching control signals PWM are generated in short time period (from time point t1 to time point t2). This plurality of switching control signals PWM causes the inductor current to rise rapidly. Then the inductor would store much more power than needed after the new steady state is reached. The redundant power would charge an output capacitor, which pumps the output voltage $V_O$, and causes an overshoot issue. In some worst situations, voltage ring back may occur.

SUMMARY

It is an object of the present invention to provide an improved DC-DC converter with transient control, which solves the above problems.

In accomplishing the above and other objects, there has been provided, in accordance with an embodiment of the present invention, a DC-DC converter, comprising: a power switching circuit, controlled to be periodically ON and OFF to convert an input voltage into an output voltage to power a load; a current to voltage converter, configured to convert a difference of a current sense signal and a current compensation signal into a voltage compensation signal, the current sense signal indicative of a current flowing through the power switching circuit; a proportional integral circuit, configured to integrate the voltage compensation signal to generate an integral signal; a voltage to current converter, configured to convert the integral signal into the current compensation signal; and a logic and control circuit, configured to generate a switching control signal PWM to control the power switching circuit in response to a sum of the voltage compensation signal and a differential voltage indicative of the output voltage.

In addition, there has been provided, in accordance with an embodiment of the present invention, a DC-DC converter, comprising: a power switching circuit, controlled to be periodically ON and OFF to convert an input voltage into an output voltage to power a load; a current to voltage converter, configured to convert a difference of a current sense signal and a current compensation signal into a voltage compensation signal, the current sense signal indicative of a current flowing through the power switching circuit; a proportional integral circuit, configured to integrate the voltage compensation signal to generate an integral signal; a voltage to current converter, configured to convert the integral signal into the current compensation signal; and a logic and control circuit, configured to generate a switching control signal PWM to control the power switching circuit in response to a sum of the voltage compensation signal and a differential voltage indicative of the output voltage.

Furthermore, there has been provided, in accordance with an embodiment of the present invention, a method used in a DC-DC converter, the DC-DC converter including a power switching circuit configured to receive an input voltage and generate an output voltage to power a load, the method comprising: deriving a differential voltage indicative of the output voltage and a current sense signal indicative of a current flowing through the power switching circuit; detecting whether the DC-DC converter is in a steady state condition or in a transient state condition: generating a current compensation signal counteracted with the current sense signal, and controlling the power switching circuit in response to the differential voltage when the DC-DC converter is in the steady state condition; and adding the current sense signal to the differential voltage, and controlling the power switching circuit in response to a sum of the differential voltage and the current sense signal when the DC-DC converter is in the transient state condition.

The use of the similar reference label in different drawings indicates the same of like components.

DETAILED DESCRIPTION

Embodiments of circuits for DC-DC converter are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
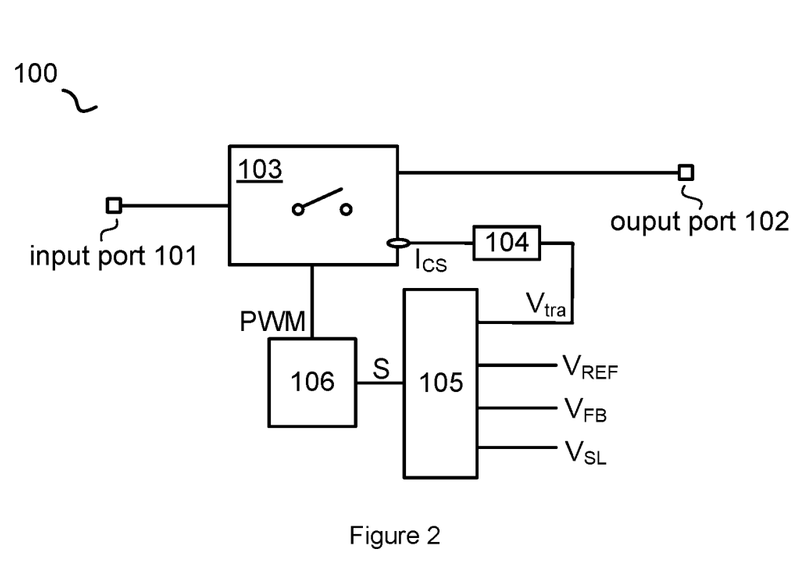
FIG. 2 schematically shows a DC-DC converter 100 in accordance with an embodiment of the present invention.

FIG. 2 schematically shows a DC-DC converter 100 in accordance with an embodiment of the present invention. In the example of FIG. 2, the DC-DC converter 100 comprises: an input port 101, configured to receive an input voltage Vin; an output port 102, configured to provide an output voltage $V_O$; a power switching circuit 103, coupled between the input port 101 and the output port 102; a control circuit, configured to provide a switching control signal PWM, to control the operation of the power switching circuit 103, the control circuit including: a transient unit 104, configured to receive a current sense signal $I_{CS}$ indicative of a current flowing through the power switching circuit 103, to generate a transient current signal $V_{tra}$; a comparing circuit 105, configured to receive a reference voltage $V_{REF}$, a feedback voltage $V_{FB}$ indicative of the output voltage $V_O$, a slope compensation signal $V_{SL}$ and the transient current signal $V_{tra}$, to generate a set signal S; and a logical control circuit 106, configured to receive the set signal S, to generate a switching control signal PWM; wherein when a sum of the feedback voltage $V_{FB}$ and the transient current signal $V_{tra}$ is less than a sum of the reference voltage $V_{REF}$ and the slope compensation signal $V_{DL}$ (i.e. below expression (1)), the set signal S goes high, and the switching control signal PWM is triggered by the set signal S to turn on the power switching circuit 103.

$$V_{FB}V_{tra} < V_{REF} + V_{SL} \tag{1}$$

In one embodiment, the current sense signal $I_{CS}$ may be a current signal or a voltage signal.

In one embodiment, the slope compensation signal $V_{SL}$ is reset to zero and increases with a fixed slope when a main power switch in the power switching circuit 103 turns on.

In one embodiment, the transient current signal $V_{tra}$ generated by the transient unit 104 is indicative of the transient information (i.e. the AC component) of the current sense signal $I_{CS}$.

During the operation of the DC-DC converter, when the load step occurs (e.g. the load jumps to heavy load from light load very fast and within a short period of time), the output voltage $V_O$ decreases. The frequency of the switching control signal PWM increases, and the current flowing through the power switching circuit 103 increases, i.e. the current sense signal $I_{CS}$ increases. The transient current signal $V_{tra}$ also increases. Thus the variation of the output voltage $V_O$ slows down according to expression (1). As a result, the set signal postpones triggering the switching control signal PWM, which reduces the pulses of the switching control signal PWM. So the energy stored in the inductor is reduced during the load step, and the overshoot is eliminated, which ensures the system stability.

Figure 3:
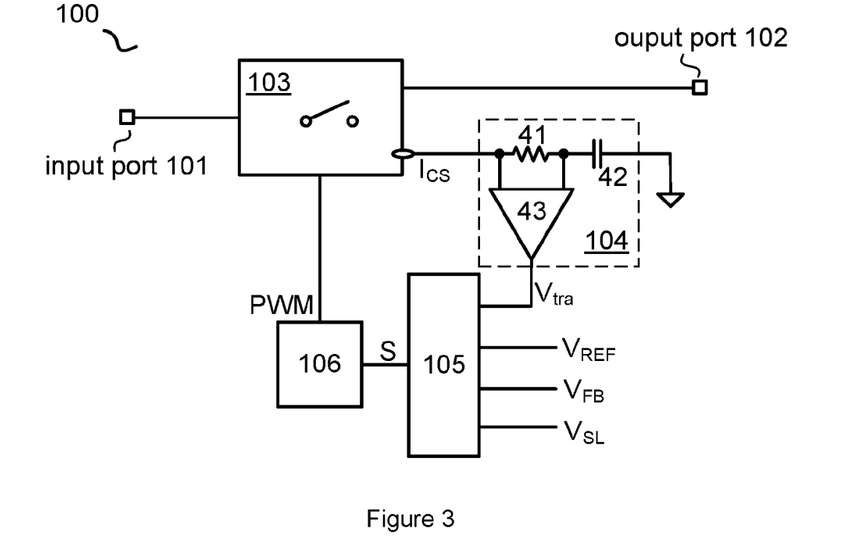
FIG. 3 schematically shows a circuit configuration of the transient unit 104 in the DC-DC converter 100 in FIG. 2 in accordance with an embodiment of the present invention.

FIG. 3 schematically shows a circuit configuration of the transient unit 104 in the DC-DC converter 100 in FIG. 2 in accordance with an embodiment of the present invention. In the example of FIG. 3, the transient unit 104 comprises: a resistor 41, having a first end and a second end, wherein the first end is configured to receive the current sense signal $I_{CS}$; a capacitor 42, coupled between the second end of the resistor 41 and a reference ground; and an operation amplifier 43, coupled crossover the resistor 41 to receive a voltage across the resistor 41, to generate the transient current signal $V_{tra}$.

When the system is in operation, if the load step occurs (e.g. the load jumps to heavy load from light load), the current sense signal $I_{CS}$ increases. Then the voltage across the resistor 41 also increases, i.e. the transient current signal $V_{tra}$ increases. According to expression (1), the variation of the output voltage $V_O$ slows down, and the set signal postpones triggering the switching control signal PWM, which reduces the pulses of the switching control signal PWM. So the energy stored in the inductor is reduced during the load step, and the overshoot is eliminated as discussed above. In a steady state, due to the existence of the capacitor 42, the average voltage across the resistor 41 is zero. So the transient current signal $V_{tra}$ provided by the transient unit 104 reflects the transient information of the current sense signal $I_{CS}$. That is, the transient current signal $V_{tra}$ reflects the transient information (the alternating information) of the current flowing through the power switching circuit 103.

Figure 4:
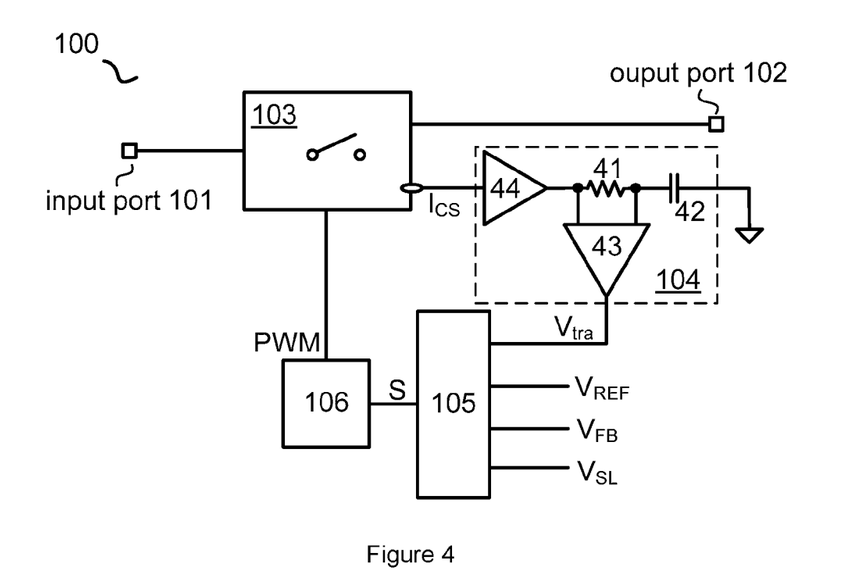
FIG. 4 schematically shows a circuit configuration of the transient unit 104 in the DC-DC converter 100 in FIG. 2 in accordance with an embodiment of the present invention.

FIG. 4 schematically shows a circuit configuration of the transient unit 104 in the DC-DC converter 100 in FIG. 2 in accordance with an embodiment of the present invention. The transient unit 104 in FIG. 4 is similar to that in FIG. 3, with a difference that the transient unit 104 in FIG. 4 further comprises: a current-voltage converter 44, wherein the resistor 41 is configured to receive the current sense signal $I_{CS}$ via the current-voltage converter 44. When the current sense signal $I_{CS}$ is a current signal, the current-voltage converter 44 converts the current form into voltage form; and then it delivers the voltage form to the first end of the resistor 41.

Figure 5:
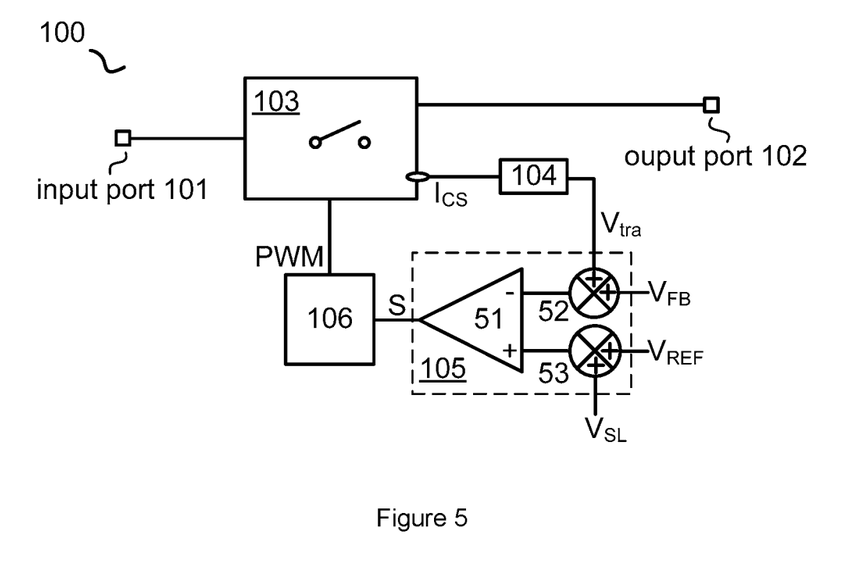
FIG. 5 schematically shows a circuit configuration of the comparing circuit 105 in the DC-DC converter 100 in FIG. 2 in accordance with an embodiment of the present invention.

FIG. 5 schematically shows a circuit configuration of the comparing circuit 105 in the DC-DC converter 100 in FIG. 2 in accordance with an embodiment of the present invention. In the example of FIG. 5, the comparing circuit 105 comprises: a comparator 51, having a first input terminal, a second input terminal and an output terminal; a first adder 52, configured to receive the transient current signal $V_{tra}$ and the feedback voltage $V_{FB}$, to execute add operation on the transient current signal $V_{tra}$ and the feedback voltage $V_{FB}$, and deliver the add result to the first input terminal of the comparator 51; and a second adder 53, configured to receive the reference voltage $V_{REF}$ and the slope compensation signal $V_{SL}$, to execute add operation on the reference voltage $V_{REF}$ and the slope compensation signal $V_{SL}$, and deliver the add result to the second input terminal of the comparator 51; wherein the comparator 51 compares the signal at its first input terminal with that at its second input terminal to generate the set signal S.

Figure 6:
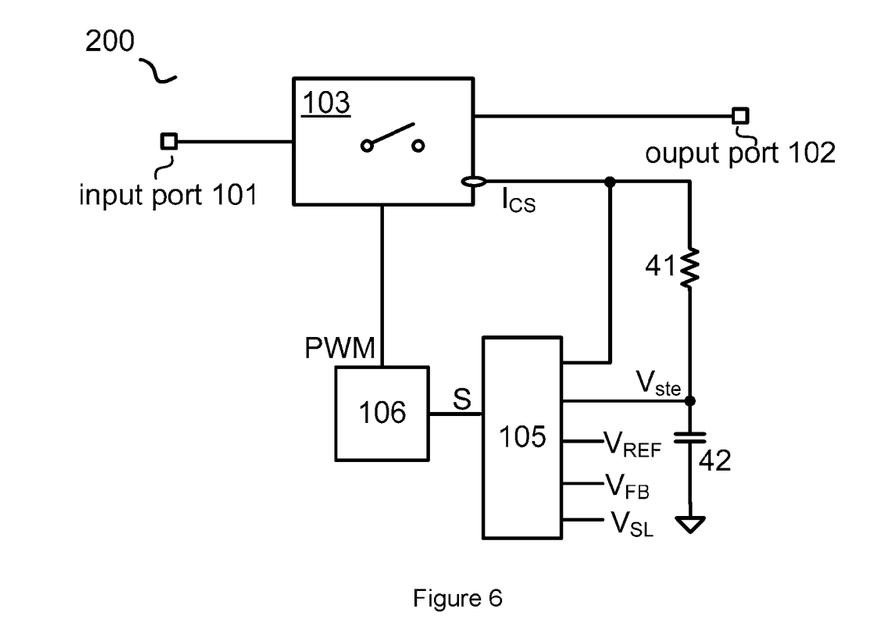
FIG. 6 schematically shows a DC-DC converter 200 in accordance with an embodiment of the present invention.

FIG. 6 schematically shows a DC-DC converter 200 in accordance with an embodiment of the present invention. In the example of FIG. 6, the DC-DC converter 200 comprises: an input port 101, configured to receive an input voltage Vin; an output port 102, configured to provide an output voltage $V_O$; a power switching circuit 103, coupled between the input port 101 and the output port 102; a control circuit, configured to provide a switching control signal PWM, to control the operation of the power switching circuit 103, the control circuit including: a resistor 41, having a first end and a second end, wherein the first end is configured to receive the current sense signal $I_{CS}$; a capacitor 42, coupled between the second end of the resistor 41 and a reference ground, the voltage across the capacitor 42 being a steady current signal $V_{ste}$; a comparing circuit 105, configured to receive a reference voltage $V_{REF}$, a feedback voltage $V_{FB}$ indicative of the output voltage $V_O$, a slope compensation signal $V_{SL}$ and the steady current signal $V_{ste}$, to generate a set signal S; and a logical control circuit 106, configured to receive the set signal S, to generate the switching control signal PWM, to control the operation of the power switching circuit 103.

In one embodiment, if the current sense signal $I_{CS}$ is in current form, the DC-DC converter 200 further comprises a current-voltage converter as shown in FIG. 4, and the resistor 41 is configured to receive the current sense signal $I_{CS}$ via the current-voltage converter.

Figure 7:
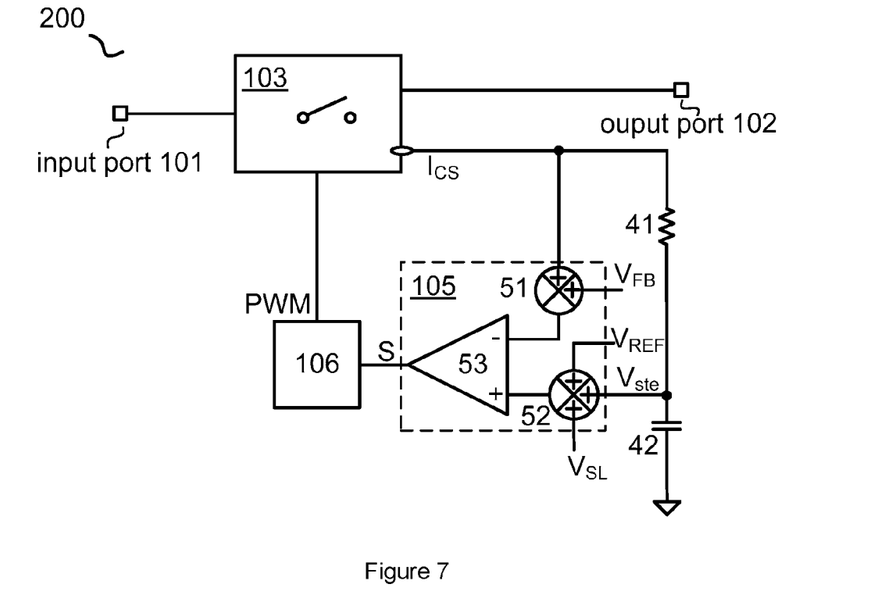
FIG. 7 schematically shows a circuit configuration of the comparing circuit 105 in the DC-DC converter 200 in FIG. 6 in accordance with an embodiment of the present invention.

FIG. 7 schematically shows a circuit configuration of the comparing circuit 105 in the DC-DC converter 200 in FIG. 6 in accordance with an embodiment of the present invention. In the example of FIG. 7, the comparing circuit 105 comprises: a comparator 51, having a first input terminal, a second input terminal and an output terminal; a first adder 52, configured to receive the current sense signal $I_{CS}$ and the feedback voltage $V_{FB}$, to execute add operation on the current sense signal $I_{CS}$ and the feedback voltage $V_{FB}$, and deliver the add result to the first input terminal of the comparator 51; and a second adder 53, configured to receive the reference voltage $V_{REF}$, the slope compensation signal $V_{SL}$ and the steady current signal $V_{ste}$, to execute add operation on the reference voltage $V_{REF}$, the slope compensation signal $V_{SL}$ and the steady current signal $V_{ste}$, and deliver the add result to the second input terminal of the comparator 51; wherein the comparator 51 compares the signal at its first input terminal with that at its second input terminal to generate the set signal S.

When the system is in operation, the current sense signal $I_{CS}$ is delivered to the first input terminal of the comparator 53 via the first adder 51, and is delivered to the second input terminal of the comparator 53 via the resistor 41, the capacitor 42 and the second adder 52. So the current sense signal $I_{CS}$ is counteracted in the steady state condition. But in a transient state condition, e.g. when the load suddenly jumps to heavy load from light load, the current sense signal $I_{CS}$ increases rapidly. Because of the existence of the capacitor, the voltage across the capacitor 42 (i.e. the transient current signal $V_{ste}$) cannot change so fast, so the transient information of the current sense signal $I_{CS}$ is delivered to the first input terminal of the comparator 53. As a result, the variation of the output voltage $V_O$ slows down, and the set signal postpones triggering the switching control signal PWM, which reduces the pulses of the switching control signal PWM. Thus the energy stored in the inductor is reduced during the load step, and the overshoot is eliminated.

Figure 8:
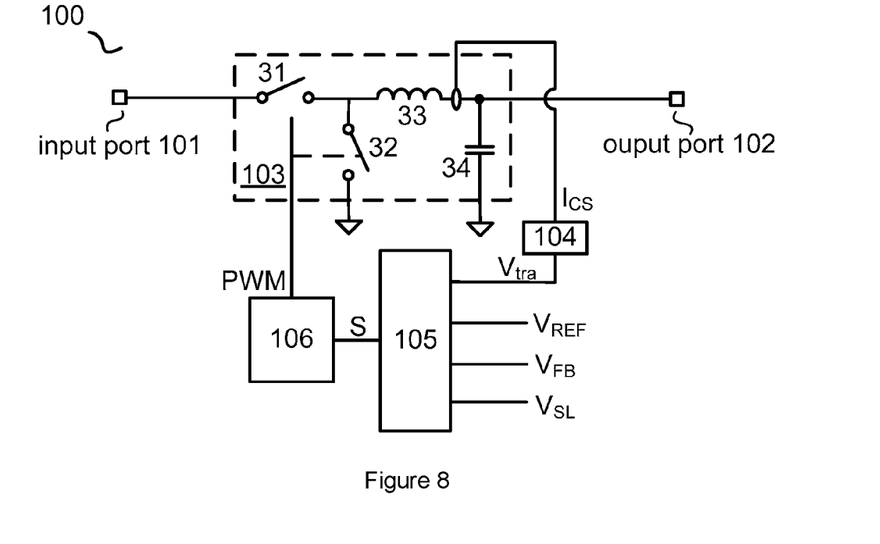
FIG. 8 schematically shows a circuit configuration of the power switching circuit 103 in accordance with an embodiment of the present invention.
Figure 9:
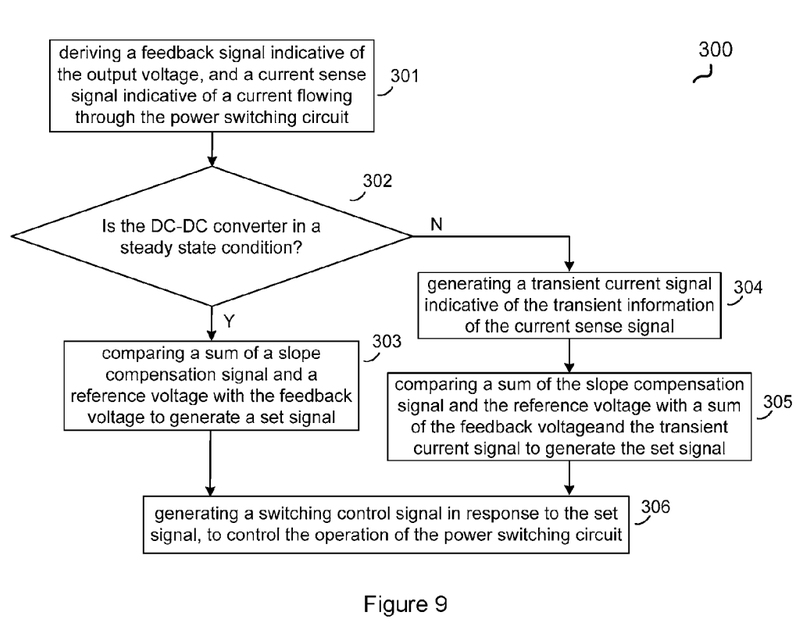
FIG. 9 schematically shows a flow chart 300 of a method used in a DC-DC converter in accordance with an embodiment of the present invention.

FIG. 8 schematically shows a circuit configuration of the power switching circuit 103 in accordance with an embodiment of the present invention. In the example of FIG. 8, the power switching circuit 103 comprises a typical buck circuit. That is, the power switching circuit 103 comprises: a high side power switch 31, a low side power switch 32, an inductor 33 and an output capacitor 34 connected as shown. The configuration of buck circuit is well known in the art, and will not be discussed in detail for brief illustration, FIG. 9 schematically shows a flow chart 300 of a method used in a DC-DC converter in accordance of the present invention. The DC-DC converter including a power switching circuit configured to receive an input voltage and generate an output voltage, the method comprises:

Step 301, deriving a feedback signal indicative of the output voltage, and a current sense signal indicative of a current flowing through the power switching circuit.

Step 302, detecting whether the DC-DC converter is in a steady state condition or not, if the DC-DC converter is in the steady state condition, go to step 303; and if the DC-DC converter is in a transient state condition, go to step 304.

Step 303, comparing a sum of a slope compensation signal $V_{SL}$ and a reference voltage $V_{REF}$ with the feedback voltage $V_{FB}$ to generate a set signal.

Step 304, generating a transient current signal $V_{tra}$ indicative of the transient information of the current sense signal.

Step 305, comparing a sum of the slope compensation signal $V_{SL}$ and the reference voltage $V_{REF}$ with a sum of the feedback voltage $V_{FB}$ and the transient current signal to generate the set signal.

Step 306, generating a switching control signal in response to the set signal, to control the operation of the power switching circuit.

Figure 10:
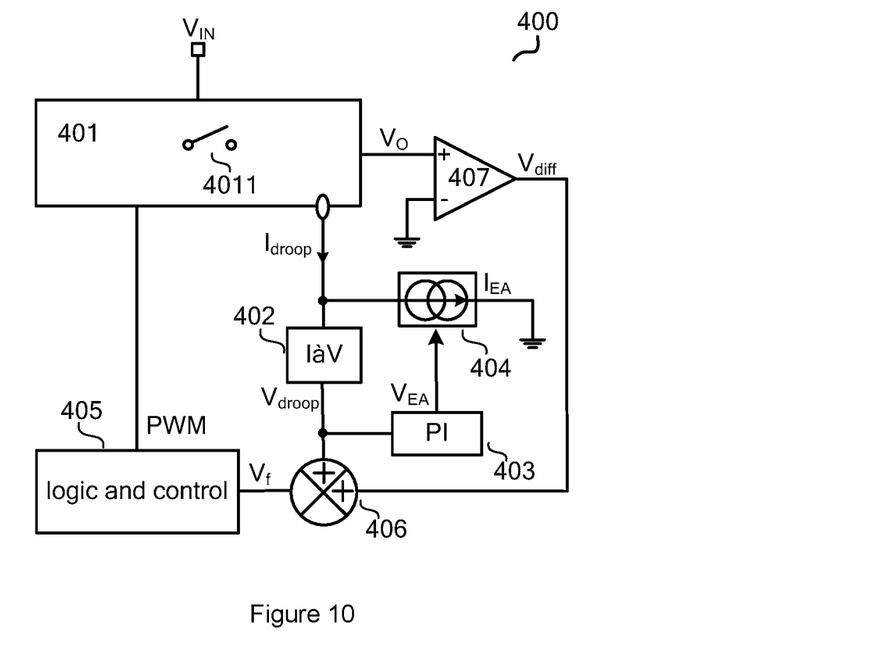
FIG. 10 schematically shows a DC-DC converter 400 in accordance with an embodiment of the present invention.

FIG. 10 schematically shows a DC-DC converter 400 in accordance with an embodiment of the present invention. In the example of FIG. 10, the DC-DC converter 400 comprises: a power switching circuit 401, controlled to be periodically ON and OFF to convert an input voltage $V_{IN}$ into an output voltage $V_O$ to power a load (such as a CPU); a current to voltage converter 402, configured to convert a difference of a current sense signal $I_{droop}$ and a current compensation signal $I_{EA}$ into a voltage compensation signal $V_{droop}$, the current sense signal $I_{droop}$ indicative of a current flowing through the power switching circuit 401; a PI (proportional integral) circuit 403, configured to integrate the voltage compensation signal $V_{droop}$ to generate an integral signal $V_{EA}$; a voltage to current converter 404, configured to convert the integral signal $V_{EA}$ into the current compensation signal $I_{EA}$; and a logic and control circuit 405, configured to generate a switching control signal PWM to control the power switching circuit 401 in response to a sum of the voltage compensation signal $V_{droop}$ and a differential voltage $V_{diff}$ indicative of the output voltage $V_O$.

In the example of FIG. 10, the power switching circuit 401 at least comprises a main power switch 4011, wherein when the main power switch 4011 is turned on, the current flowing through the power switching circuit 401 increases; and when the main switch 4011 is turned off, the current flowing through the power switching circuit 401 decreases. The power switching circuit 401 may further have a second power switch (not shown in FIG. 10), controlled to be turned on and off complementary with the main power switch 4011.

In one embodiment, the DC-DC converter 400 further comprises: an adder 406, operable to execute an add operation on the voltage compensation signal $V_{droop}$ and the differential voltage $V_{diff}$ to generate a voltage feedback signal $V_f$, wherein the voltage feedback signal $V_f$ is then delivered to the logic and control circuit 405 to generate the switching control signal PWM.

In one embodiment, the DC-DC converter 400 further comprises: a differential amplifier 407, configured to receive the output voltage $V_O$, and to generate the differential voltage $V_{diff}$.

In the steady state, when the main power switch 4011 is turned on, the current sense signal $I_{droop}$ increases as the current flowing through the power switching circuit 401 increases. The PI circuit 403 integrates the variation of the current sense signal $I_{droop}$, and generates the integral signal $V_{EA}$ reflecting the variation of the current sense signal $I_{droop}$. Then the integral signal $V_{EA}$ is converted into the current compensation signal $I_{EA}$, which is delivered to the current to voltage converter 402 together with the current sense signal $I_{droop}$. Since the current to voltage converter 402 is operable to convert the difference between the current sense signal $I_{droop}$ and the current compensation signal $I_{EA}$, the current sense signal $I_{droop}$ is counteracted by the current compensation signal $I_{EA}$ in the steady state.

In the transient state (e.g., when the load jumps to heavy load from light load very fast in a short time period), the output voltage $V_O$ decreases. The frequency of the switching control signal PWM increases, and the current flowing through the power switching circuit 401 (i.e. the current sense signal $I_{droop}$) increases fast. The PI circuit 403 continues integrating the variation of the current sense signal $I_{droop}$. But due to the fast variation of the current sense signal $I_{droop}$, the integration of the PI circuit 403 falls behind the variation of the current sense signal $I_{droop}$, and the PI circuit 403 cannot integrate the variation of the current sense signal $I_{droop}$ in time. Then the current compensation signal $I_{EA}$ cannot counteract the current sense signal $I_{droop}$. So the transient information of the current sense signal $I_{droop}$ is added to the differential voltage $V_{diff}$ by way of the voltage compensation signal $V_{droop}$, and is delivered to the logic and control circuit 405 to control the power switching circuit 401. Thus, the voltage compensation signal $V_{droop}$ reflects the transient information of the load current, which functions same as the transient current signal $V_{tra}$ in the embodiment of the DC-DC converter 100 in FIGS. 2-5. Accordingly, the variation of the output voltage $V_O$ slows down according to expression (1); and the switching control signal PWM is triggered later, which reduces the number of the PWM pulse. As a result, the energy stored in the inductor is reduced during the load step, the overshoot is eased, and the ring-back issue is eliminated, which ensures the system stability.

Figure 11:
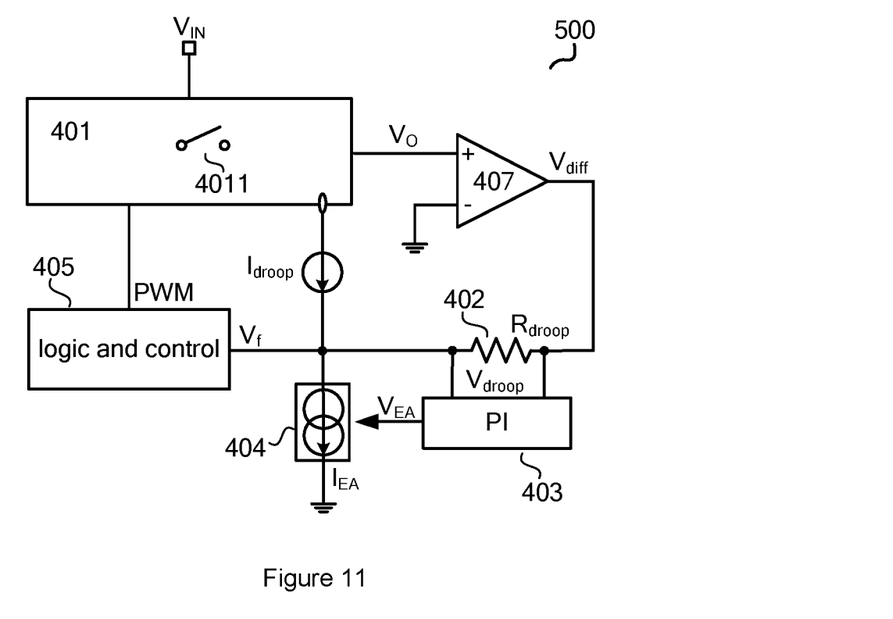
FIG. 11 schematically shows a DC-DC converter 500 in accordance with an embodiment of the present invention.

FIG. 11 schematically shows a DC-DC converter 500 in accordance with an embodiment of the present invention. In the example of FIG. 11, the current to voltage converter 402 comprises a resistor. Specifically, in the example of FIG. 11, the DC-DC converter 500 comprises: a power switching circuit 401, controlled to be periodically ON and OFF to convert an input voltage $V_{IN}$ into an output voltage $V_O$ to power a load (such as a CPU); a resistor $R_{droop}$, wherein a difference of a current sense signal $I_{droop}$ and a current compensation signal $I_{EA}$ flows through the resistor $R_{droop}$, and wherein the current sense signal $I_{droop}$ is indicative of a current flowing through the power switching circuit 401; a PI (proportional integral) circuit 403, configured to integrate a voltage $V_{droop}$ across the resistor $R_{droop}$ to generate an integral signal $V_{EA}$; a voltage to current converter 404, configured to convert the integral signal $V_{EA}$ into the current compensation signal $I_{EA}$; and a logic and control circuit 405, configured to receive a sum of a differential voltage $V_{diff}$ indicative of the output voltage $V_O$ and the voltage across the resistor $R_{droop}$ (i.e. to receive the differential voltage $V_{diff}$ via the resistor $R_{droop}$) to generate a switching control signal PWM to control the power switching circuit 401.

In one embodiment, the current sense signal $I_{droop}$ works as a current source, and the current compensation signal $I_{EA}$ works as a current sink. The difference of them flows through the resistor $R_{droop}$. The resistor $R_{droop}$ acts as the current to voltage converter 402; and the voltage across the resistor $R_{droop}$ is the voltage compensation signal $V_{droop}$. When the current sense signal $I_{droop}$ increases slowly (e.g., when the DC-DC converter 500 is in the steady state), the voltage $V_{droop}$ across the resistor $R_{droop}$ also increases. Accordingly, the integral signal $V_{EA}$ increases, causing the current compensation signal $I_{EA}$ to increase. Then the variation of the current sense signal $I_{droop}$ is counteracted by the variation of the current compensation signal $I_{EA}$. As a result, the voltage $V_{droop}$ across the resistor $R_{droop}$ is small, and little current information is added to the feedback control loop in the steady state. However, when the current sense signal $I_{droop}$ varies rapidly (e.g., when the DC-DC converter 500 is in the transient state), the current compensation signal $I_{EA}$ cannot follow the variation of the current sense signal $I_{droop}$ due to the slow reaction of the PI circuit 403. Accordingly, the difference between the current sense signal $I_{droop}$ and the current compensation signal $I_{EA}$ is not small, which may be at a same voltage level with the differential voltage $V_{diff}$. The voltage compensation signal $V_{droop}$ is added to the differential voltage $V_{diff}$, and is delivered to the logic and control circuit 405. Thus, the current information is involved in the control loop in the transient state. The energy stored in the inductor is reduced during the load step, the overshoot is eased, and the ring-back issue is eliminated as discussed above.

Figure 12:
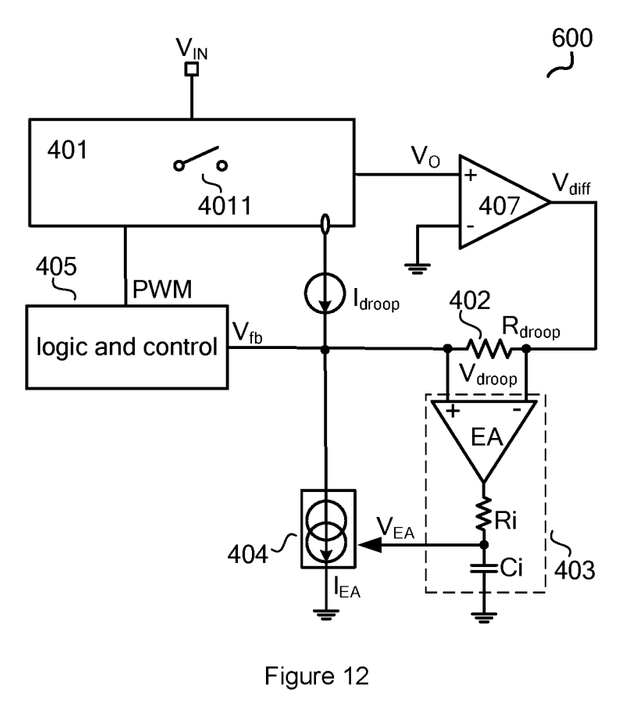
FIG. 12 schematically shows a DC-DC converter 600 with a circuit configuration of the PI circuit 403 in accordance with an embodiment of the present invention.

FIG. 12 schematically shows a DC-DC converter 600 with a circuit configuration of the PI circuit 403 in accordance with an embodiment of the present invention. In the example of FIG. 12, the PI circuit 403 comprises: an error amplifier EA, configured to amplify the voltage compensation signal $V_{droop}$, and to charge an integral capacitor Ci with the amplified voltage compensation signal, wherein a voltage across the integral capacitor Ci is the integral signal $V_{EA}$. In one embodiment, the PI circuit 403 further comprises an integral resistor Ri coupled as shown.

The other circuit configuration and the operation principle of the DC-DC converter 600 in FIG. 12 are similar to the DC-DC converter 500 in FIG. 11.

In one embodiment, the PI circuit 403 in the DC-DC converter 400 in FIG. 10 may have a same circuit configuration as the PI circuit 403 in the DC-DC converter 600 in FIG. 12. In other embodiments, the PI circuit 403 in the DC-DC converter 400 in FIG. 10 may have other circuit configurations.

Figure 13:
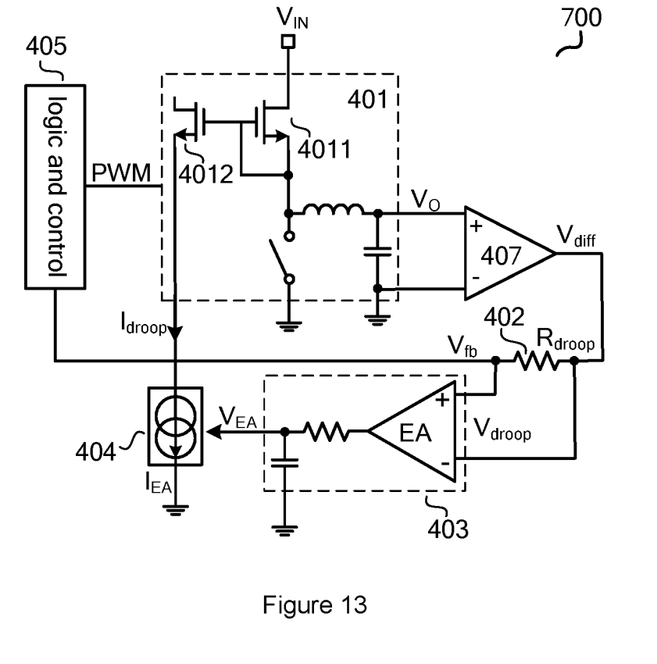
FIG. 13 schematically shows a DC-DC converter 700 with a current sense scheme in accordance with an embodiment of the present invention.

FIG. 13 schematically shows a DC-DC converter 700 with a current sense scheme in accordance with an embodiment of the present invention. In the example of FIG. 13, the power switching circuit 401 comprises a buck topology. The DC-DC converter 700 comprises the power switching circuit 401, the current to voltage converter 402, the PI circuit 403, the voltage to current converter 404 and the voltage to current converter 404 as the DC-DC converters 400, 500 and 600 in FIGS. 10-12, the DC-DC converter 700 further comprises: a sense switch 4012, configured to provide the current sense signal $I_{droop}$, wherein a current flowing through the sense switch 4012 is proportional to the current flowing through the power switching circuit 401 (i.e. the current flowing through the main power switch 4011). That is, the sense switch 4012 and the main power switch 4011 form a current mirror, to provide the current sense signal $I_{droop}$ indicative of the current flowing through the power switching circuit 401.

In one embodiment, the current flowing through the sense switch 4012 and the current flowing through the main power switch 4011 has a relationship of 1:10000. However, one skilled in the art should realize that the current flowing through the sense switch 4012 and the current flowing through the main power switch 4011 may have any other desired relationships. In the example of FIG. 13, the main power switch 4011 and the sense switch 4012 both comprise a metal oxide semiconductor field effect transistor (MOSFET). However, one skilled in the art should realize that the main power switch 4011 and the sense switch 4012 may adopt other suitable switch devices (such as bipolar junction transistor, BJT).

The other circuit configuration and the operation principle of the DC-DC converter 700 are similar to the DC-DC converter 600 in FIG. 12.

In one embodiment, the DC-DC converter 400 in FIG. 10 may have a same current sense scheme as the DC-DC converter 700 in FIG. 13.

Figure 14:
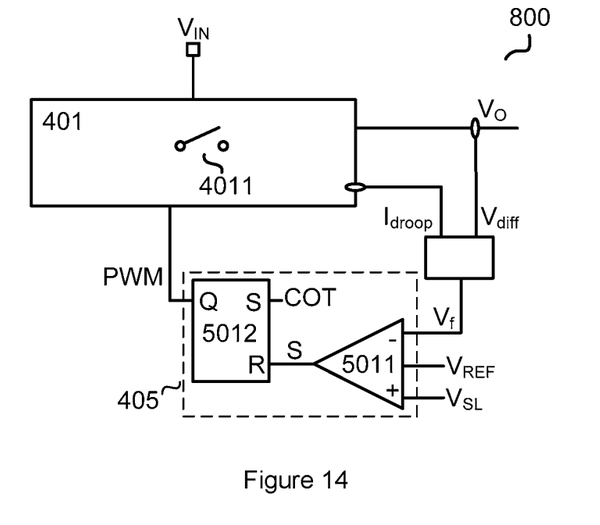
FIG. 14 schematically shows a DC-DC converter 800 with a circuit configuration of the logic and control circuit 405 in accordance with an embodiment of the present invention.

FIG. 14 schematically shows a DC-DC converter 800 with a circuit configuration of the logic and control circuit 405 in accordance with an embodiment of the present invention. In the example of FIG. 14, the logic and control circuit 405 comprises: a comparator 5011, configured to compare the voltage feedback signal $V_f$ (e.g. the sum of the voltage across the resistor $R_{droop}$ and the differential voltage $V_{diff}$ or the sum of the voltage compensation signal $V_{droop}$ and the differential voltage $V_{diff}$) with a sum of a reference voltage $V_{REF}$ and a slope compensation signal $V_{SL}$, to generate a set signal S. When the voltage feedback signal $V_f$ is lower than the sum of the reference voltage $V_{REF}$ and the slope compensation signal $V_{SL}$, the power switching circuit 401 is controlled to be turned ON.

In one embodiment, the voltage feedback signal $V_f$ is the sum of the differential voltage $V_{diff}$ and the voltage compensation signal $V_{droop}$. The voltage compensation signal $V_{droop}$ is very small (e.g. nearly zero voltage) when the DC-DC converter 800 is in the steady state; and the voltage compensation signal $V_{droop}$ may be at a same voltage level with the differential voltage $V_{diff}$ when the DC-DC converter 800 is in the transient state, so that the transient information of the load current is added to the control loop to improve the system performance.

In the example of FIG. 14, the DC-DC converter 800 further comprises: a RS flip flop 5012, configured to be set by the set signal S, and to be reset by a constant on time signal COT, to generate the switching control signal PWM.

In one embodiment, the logic and control circuit 405 in the DC-DC converter 400 in FIG. 10 and the logic and control circuit 405 in the DC-DC converter 500 in FIG. 11 may both have a same circuit configuration as the logic and control circuit 405 in the DC-DC converter 800 in FIG. 14. In other embodiments, the logic and control circuit 405 in the DC-DC converter 400 in FIG. 10 and the logic and control circuit 405 in the DC-DC converter 500 in FIG. 11 may have other circuit configurations.

Figure 15:
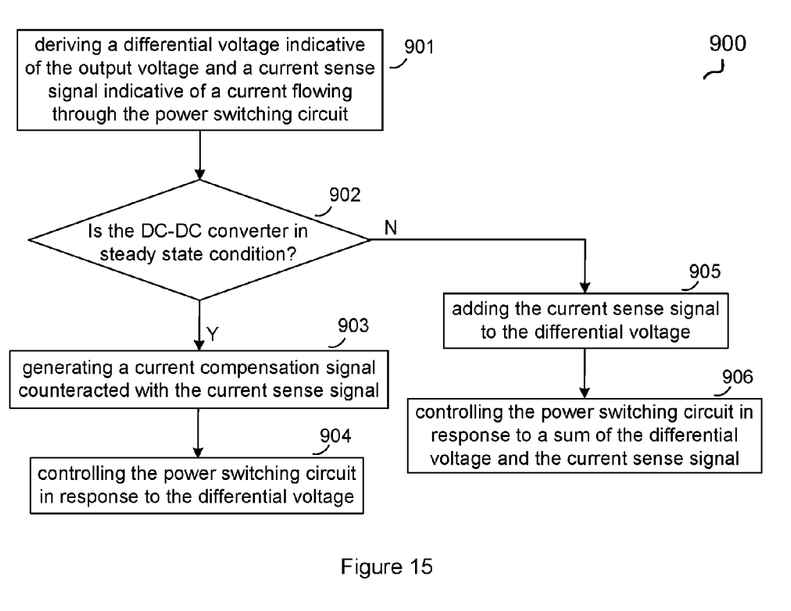
FIG. 15 schematically shows a flow chart 900 of a method used in a DC-DC converter in accordance with an embodiment of the present invention.

FIG. 15 schematically shows a flow chart 900 of a method used in a DC-DC converter in accordance with an embodiment of the present invention. The DC-DC converter including a power switching circuit configured to receive an input voltage and generate an output voltage to power a load (such as a CPU), the method comprises:

Step 901, deriving a differential voltage indicative of the output voltage and a current sense signal indicative of a current flowing through the power switching circuit.

Step 902, detecting whether the DC-DC converter is in a steady state condition or not, if the DC-DC converter is in the steady state condition, go to step 903; on the contrary, if the DC-DC converter is in a transient state condition, go to step 905.

Step 903, generating a current compensation signal counteracted with the current sense signal.

Step 904, controlling the power switching circuit in response to the differential voltage.

Step 905, adding the current sense signal to the differential voltage.

Step 906, controlling the power switching circuit in response to a sum of the differential voltage and the current sense signal.

In one embodiment, the current sense signal is a mirrored current of the current flowing through the power switching circuit.

In one embodiment, the method further comprising: comparing the sum of the differential voltage and the current sense signal with a sum of a reference voltage and a slope compensation signal. When the sum of the differential voltage and the current sense signal is lower than the sum of the reference voltage and the slope compensation signal, the power switching circuit is controlled to be turned ON.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A DC-DC converter, comprising:
a power switching circuit, controlled to be periodically ON and OFF to convert an input voltage into an output voltage to power a load;
a current to voltage converter, configured to convert a difference of a current sense signal and a current compensation signal into a voltage compensation signal, the current sense signal indicative of a current flowing through the power switching circuit, and the current to voltage converter comprising a first input terminal, a second input terminal and an output terminal, wherein the first input terminal is configured to receive the current sense signal, the second input terminal is configured to receive the current compensation signal, and the output terminal is configured to output the voltage compensation signal;
a proportional integral circuit, configured to integrate the voltage compensation signal to generate an integral signal, the proportional integral circuit comprising an input terminal and an output terminal, wherein the input terminal of the proportional integral circuit is coupled to the output terminal of the current to voltage converter to receive the voltage compensation signal, and the output terminal of the proportional integral circuit is configured to output the integral signal;
a voltage to current converter, configured to convert the integral signal into the current compensation signal, the voltage to current converter comprising an input terminal and an output terminal, wherein the input terminal of the voltage to current converter is coupled to the output terminal of the proportional integral circuit to receive the integral signal, and the output terminal of the voltage to current converter is coupled to the second input terminal of the current to voltage converter to output the current compensation signal; and
a logic and control circuit, configured to generate a switching control signal PWM to control the power switching circuit in response to a sum of the voltage compensation signal and a differential voltage indicative of the output voltage; wherein
when the output voltage of the power switching circuit is in a steady state, the current sense signal is counteracted by the current compensation signal.

2. The DC-DC converter of claim 1, further comprising:
a differential amplifier, configured to receive the output voltage, and to generate the differential voltage.

3. The DC-DC converter of claim 1, further comprising:
a sense switch, configured to provide the current sense signal, wherein a current flowing through the sense switch is proportional to the current flowing through the power switching circuit.

4. The DC-DC converter of claim 1, wherein the proportional integral circuit comprises:
an error amplifier, configured to amplify the voltage compensation signal, and to charge an integral capacitor with the amplified voltage compensation signal, wherein a voltage across the integral capacitor is the integral signal.

5. The DC-DC converter of claim 1, wherein the logic and control circuit comprises:
a comparator, configured to compare the sum of the voltage compensation signal and the differential voltage with a sum of a reference voltage and a slope compensation signal, wherein when the sum of the voltage compensation signal and the differential voltage is lower than the sum of the reference voltage and the slope compensation signal, the power switching circuit is controlled to be ON.

6. The DC-DC converter of claim 1, further comprising:
an adder, operable to execute an add operation on the voltage compensation signal and the differential voltage to generate a voltage feedback signal, wherein the voltage feedback signal is delivered to the logic and control circuit to generate the switching control signal.

7. A DC-DC converter, comprising:
a power switching circuit, controlled to be periodically ON and OFF to convert an input voltage into an output voltage to power a load;
a resistor, comprising a first side and a second side, wherein a difference of a current sense signal and a current compensation signal flows through the resistor, and wherein the current sense signal is indicative of a current flowing through the power switching circuit;
a proportional integral circuit, configured to integrate a voltage across the resistor to generate an integral signal, the proportional integral circuit comprising a first input terminal, a second input terminal and an output terminal, wherein the first input terminal of the proportional integral circuit is coupled to the first side of the resistor, the second input terminal of the proportional integral circuit is coupled to the second side of the resistor, the first input terminal and the second input terminal are configured to receive the voltage across the resistor, and the output terminal is configured to output the integral signal;
a voltage to current converter, configured to convert the integral signal into the current compensation signal, the voltage to current converter comprising an input terminal and an output terminal, wherein the input terminal of the voltage to current converter is coupled to the output terminal of the proportional integral circuit to receive the integral signal, and the output terminal of the voltage to current converter is configured to output the current compensation signal; and
a logic and control circuit, configured to receive a sum of a differential voltage indicative of the output voltage and the voltage across the resistor to generate a switching control signal to control the power switching circuit wherein
when the output voltage of the power switching circuit is in a steady state, the current sense signal is counteracted by the current compensation signal.

8. The DC-DC converter of claim 7, further comprising:
a differential amplifier, configured to receive the output voltage, and to generate the differential voltage.

9. The DC-DC converter of claim 7, further comprising:
a sense switch, configured to provide the current sense signal, wherein a current flowing through the sense switch is proportional to the current flowing through the power switching circuit.

10. The DC-DC converter of claim 7, wherein the proportional integral circuit comprises:
an error amplifier, configured to amplify a voltage across the resistor, and to charge an integral capacitor with the amplified voltage across the resistor, wherein a voltage across the integral capacitor is the integral signal.

11. The DC-DC converter of claim 7, wherein the logic and control circuit comprises:
a comparator, configured to compare the sum of the voltage across the resistor and the differential voltage with a sum of a reference voltage and a slope compensation signal, wherein when the sum of the voltage across the resistor and the differential voltage is lower than the sum of the reference voltage and the slope compensation signal, the power switching circuit is controlled to be ON.

12. A method used in a DC-DC converter, the DC-DC converter including a power switching circuit configured to receive an input voltage and generate an output voltage to power a load, the method comprising:

deriving a differential voltage indicative of the output voltage and a current sense signal indicative of a current flowing through the power switching circuit;

generating a voltage compensation signal based on a difference of the current sense signal and the current compensation signal;

detecting whether the output voltage of the DC-DC converter is in a steady state condition or in a transient state condition:

generating the current compensation signal counteracted with the current sense signal, and controlling the power switching circuit in response to the differential voltage when the output voltage of the DC-DC converter is in the steady state condition; and adding the voltage compensation signal to the differential voltage, and controlling the power switching circuit in response to a sum of the differential voltage and the voltage compensation signal when the output voltage of the DC-DC converter is in the transient state condition.

13. The method of claim 12, wherein the current sense signal is a mirrored current of the current flowing through the power switching circuit.

14. The method of claim 12, further comprising:

comparing the sum of the differential voltage and the current compensation signal with a sum of a reference voltage and a slope compensation signal, wherein when the sum of the differential voltage and the current sense signal is lower than the sum of the reference voltage and the slope compensation signal, the power switching circuit is controlled to be turned ON.

* * * * *